RADIO NAVIGATION SYSTEMS

Filed July 31, 1947

2 Sheets-Sheet 1

Inventor
John S. Russo &
Harlan W. Collar

By [signature]
ATTORNEY

Dec. 24, 1957 J. S. RUSSO ET AL 2,817,834

RADIO NAVIGATION SYSTEMS

Filed July 31, 1947 2 Sheets-Sheet 2

Inventor:
John S. Russo &
Harlan W. Collar
By C D Tuska
ATTORNEY

United States Patent Office 2,817,834

Patented Dec. 24, 1957

2,817,834

RADIO NAVIGATION SYSTEMS

John S. Russo, Philadelphia, Pa., and Harlan W. Collar, Sewell, N. J., assignors, by mesne assignments, to the United States of America as represented by the Secretary of the Air Force Application July 31, 1947, Serial No. 765,158

4 Claims. (Cl. 343—13)

This invention relates to radio navigation systems of the type described in copending U. S. patent application Ser. No. 638,387, filed December 29, 1945, by Stuart W. Seeley and entitled Radio Navigation System, now Patent 2,526,287, issued October 17, 1950, which transmit radio pulses from a mobile craft to a pair of repeating or reflecting ground stations and then receive the pulses from the ground stations to determine the distances to the craft from the ground stations.

In said Seeley system certain operations must be performed manually by an attendant in order to obtain useful information. By means of equipment which responds to the relative timing of pulses transmitted from the craft and pulses received from the ground stations, the operation of the system can be made substantially automatic, so that information as to the distances to the ground stations is available directly and continuously. This information may be presented in the form of rotary displacements of a pair of output shafts, for driving distance indicators or automatic steering equipment.

The principal object of the present invention is to provide a method of and means for effecting unattended operation of the mobile station equipment in a system such as that of the above mentioned Seeley application. The invention will be described with reference to the accompanying drawings wherein.

Figure 1:
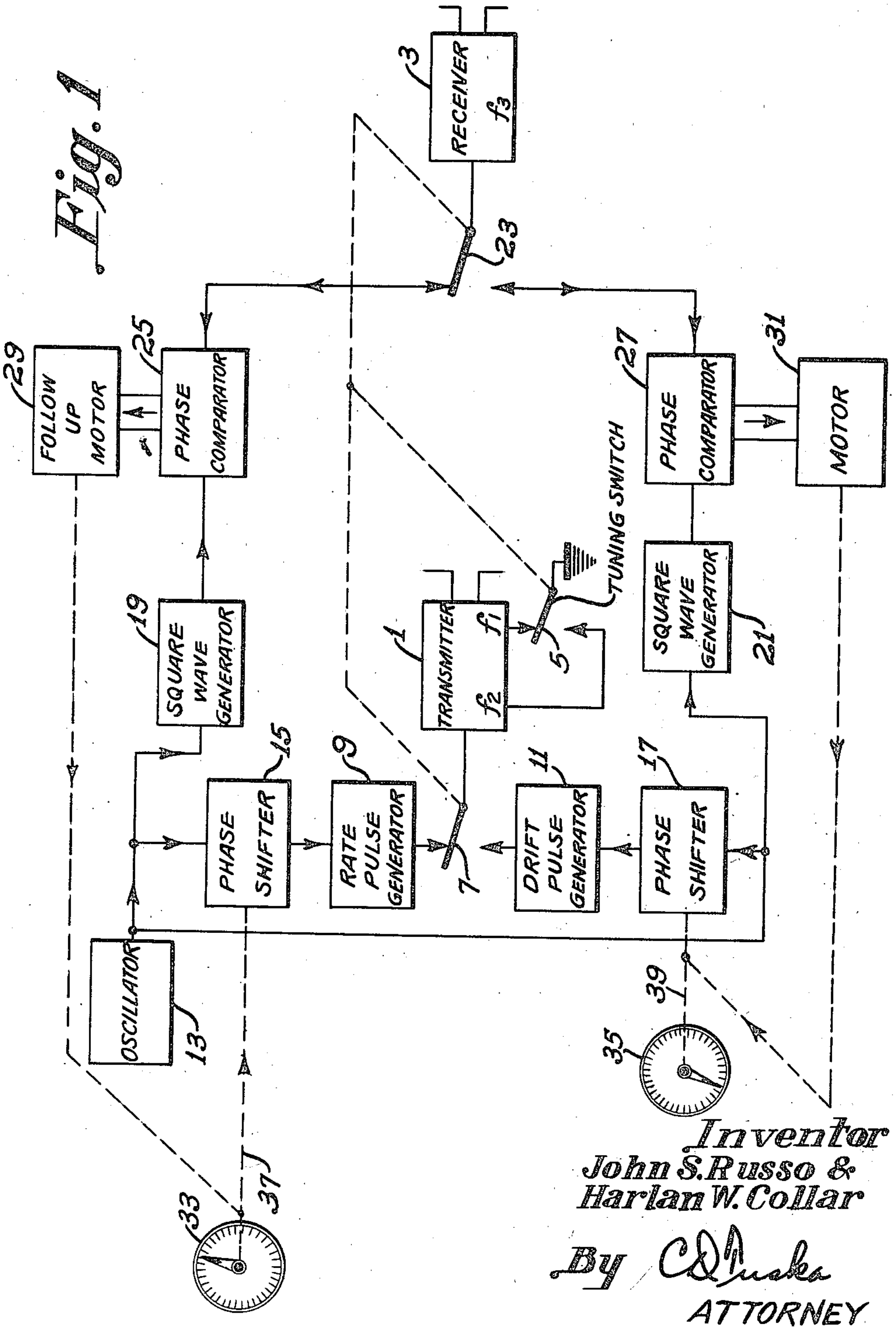
Fig. 1 is a schematic block diagram of a complete mobile station embodying the invention, with certain simplifications to facilitate explanation of the relationship between the present invention and the rest of the system.

Referring to Fig. 1, the mobile station includes a transmitter 1 and a receiver 3. The transmitter is operated alternately at different frequencies $f_1$ and $f_2$ by a periodic switch 5 which changes the tuning at a rate of, for example, ten times per second. The two ground stations, not shown, are designed to respond to the frequencies $f_1$ and $f_2$ respectively, retransmitting on a carrier frequency $f_3$ the signals sent out on frequencies $f_1$ and $f_2$ by the transmitter 1. In the present description the ground station which responds to $f_1$ will be referred to as the "rate" station, and the other will be called the "drift" station. The receiver 3 is tuned to the frequency $f_3$ and thus responds to both ground stations.

A periodic switch 7 is operated in synchronism with the switch 5 to connect the transmitter 1 alternately to two pulse generators 9 and 11 respectively. Since the pulse generator 9 modulates the transmitter during transmission on the frequency $f_1$ to the rate station, it is referred to as the "rate pulse" generator. Similarly, generator 11 is the "drift pulse" generator.

Both pulse generators 9 and 11 are controlled by a timing oscillator 13, to which they are connected through adjustable phase shifters 15 and 17 respectively. Output from the oscillator 13 is supplied also to two square wave generators 19 and 21.

The output circuit of the receiver 3 is connected through a double throw switch 23 to two phase comparators 25 and 27. The switch 23 is synchronized with the switches 5 and 7 so that signals received from the rate station are applied to the phase comparator 25, and those from the drift station go to the phase comparator 27.

Motors 29 and 31 are connected to the phase detectors 25 and 27 respectively, and are mechanically coupled to the phase shifters 15 and 17. Indicators 33 and 35, calibrated in units of distance, such as miles, are provided on the shafts 37 and 39 of the phase shifters 15 and 17 respectively. The shafts 37 and 39 may also be connected to control mechanism (not shown) for steering the craft to a predetermined destination.

In the operation of the system of Fig. 1, the timing oscillator 13 provides a substantially sine-wave constant frequency voltage which controls the square wave generator 19 to produce a square wave bearing a fixed phase relationship to the sine wave timing signal. The output of the oscillator 13 likewise controls the rate pulse generator 9, but the phase relationship between the timing signals and the rate pulses depends upon the adjustment of the phase shifter 15.

When the switches 5, 7 and 23 are in the positions shown, the rate pulses are transmitted on carrier frequency $f_1$ to the rate station, retransmitted on frequency $f_3$, and received at the receiver 3. Each pulse in the output of the receiver 3 is delayed with respect to the corresponding transmitted pulse by an interval determined by the distance of the rate station from the craft.

The phase comparator 25 provides a D.-C. output depending upon the time relationship between the received rate pulse and the square wave from the generator 19. When the pulse coincides with the zero crossover of the square wave the output of the phase comparator is zero. If the pulse occurs during a positive excursion of the square wave, the phase comparator output is of such polarity as to cause the motor 29 to run in the corresponding direction, say clockwise. If the pulse occurs during a negative excursion of the square wave, the motor runs in the other direction.

The connections are such that the motor 29 adjusts the phase shifter 15 to advance the phase of the rate pulse generator 9 by an amount corresponding to the time interval between transmission of each pulse from the transmitter 1 and reception of the resulting retransmitted pulse by the receiver 3. The angular displacement of the phase shifter shaft 37 with respect to a fixed reference position is thus directly proportional to the distance of the craft from the rate station. As the distance changes, the motor 29 is energized to keep the phase advance introduced by the phase shifter 15 substantially equal to the rate pulse delay.

The "drift" channel, comprising the phase shifter 17, generators 11 and 21, and the phase comparator 27, operates like the rate channel. As the switches 5, 7 and 23 alternate from one connection to the other, the rate and drift channels operate alternately to correct the adjustments of the phase shifters 15 and 17. The indicators 33 and 35 provide substantially continuously corrected indications of the respective distances of the rate and drift stations.

The system of Fig. 1 has been shown with a simple timing oscillator and one phase shifter in each pulse generator channel. However, it is to be understood that the more complicated multiple phase shifter and pulse selector arrangement shown in the aforesaid Seeley application may be used in order to meet the conflicting requirements of high accuracy and long range.

Figure 2:
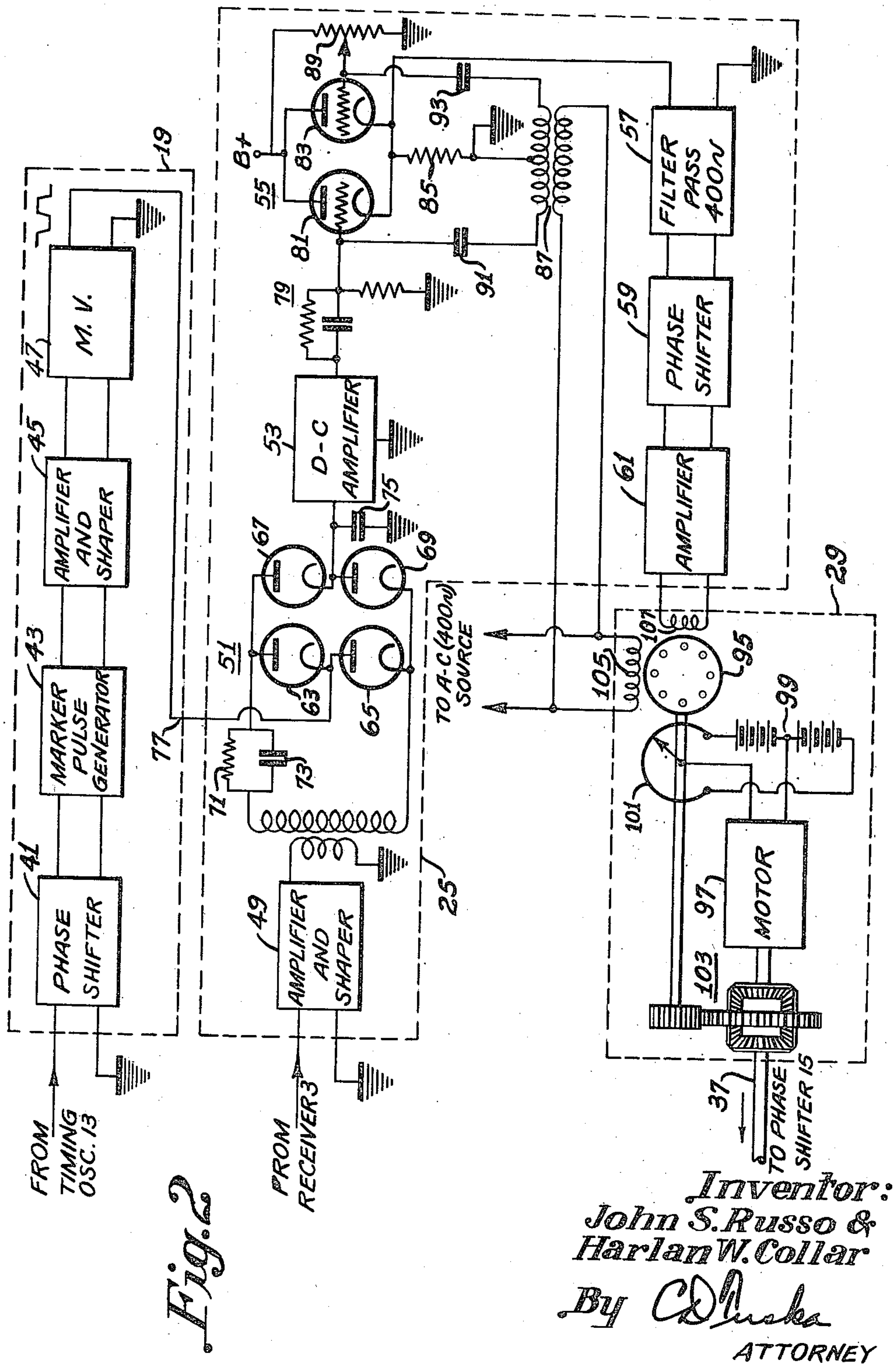
Fig. 2 is a more detailed diagram of a portion of the system shown in Fig. 1, illustrating the portion of the system constituting the present invention.

Referring now to Fig. 2, the pulse comparator and follow-up system associated with the rate channel of Fig. 1 is shown in detail.

The square wave generator 19 includes a phase shifter 41, a marker pulse generator 43, an amplifier and wave shaper 45, and a multivibrator 47. The phase shifter 41 is a set-up or calibration adjustment. The marker pulse generator 43 may be a blocking oscillator or other well known device which is synchronized by the timing signal from the phase shifter 41. The marker pulses are amplified and shaped by the amplifier 45, and applied to the multivibrator 47, which initiates a square wave in response to each marker pulse.

The phase comparator 25 includes an amplifier and wave shaper 49, a phase detector 51, a D.-C. amplifier 53, a converter circuit 55, a filter 57, phase shifter 59, and a power amplifier 61. The amplifiers 49, 53 and 61, the filter 57, and the phase shifter 59 are of ordinary design and need not be described further.

The phase detector 51 includes four diodes 63, 65, 67 and 69 connected in a bridge arrangement. The received rate pulses, after amplification and shaping in the amplifier 49, are applied across one diagonal of the diode network, and the square waves from the generator 19 are applied across the other diagonal. A resistor 71 and a capacitor 73 are provided in the connection to the amplifier 49. A capacitor 75 is included in the ground side of the connections between the square wave generator 19 and the diodes.

Any conduction through the diodes and the resistor 71 produces a voltage drop which tends to oppose further conduction. This drop is maintained to some extent by the capacitor 73, so that the resistor 71 and the capacitor 73 act as a bias against conduction through the diodes. The square wave voltage from the generator 19 has an amplitude less than the bias, and therefore cannot by itself cause any current to flow. However, when a positive-going rate pulse appears, the sum of the rate pulse voltage and the square wave voltage is more than the bias. Suppose that the rate pulse occurs when the upper (ungrounded) terminal 77 of the square wave generator is positive. Then the diodes 65 and 67 will conduct, while the diodes 63 and 69 will remain cut off. The current from the square wave generator will flow through the diode 65, the coupling to the amplifier 49, the resistor 71, the diode 67, and into the capacitor 75. Thus, during the rate pulse, the capacitor 75 will be charged in a positive direction, i. e., the upper terminal will be positive with respect to ground.

As long as the rate pulses are received during positive excursions of the square wave, the capacitor 75 will be charged positive up to the point where the voltage across it is enough to prevent further conduction through the diodes. When the rate pulses come during negative excursions of the square wave, conduction occurs downward through the diode 63, from left to right through the resistor 71, up through the coupling to the amplifier 49, and down through the diode 69. This charges the capacitor 75 negatively with respect to ground.

When the rate pulses coincide with the crossover (change from one polarity to the other) of the square wave, both of the above described actions take place, and the net charge on the capacitor 75 is zero. Thus the polarity of the voltage, if any, on the capacitor 75, depends upon the direction of the deviation in phase, if any, between the received rate pulses and the timing signal. The voltage on the capacitor 75 may be made proportional to the deviation within certain limits by making the square wave slightly trapezoidal. This can be accomplished by suitable adjustment of the multivibrator 47.

The D.-C. amplifier 53 functions principally to isolate the phase detector 51 from the converter circuit 55, by presenting a high impedance load to the phase detector. A differentiating circuit 79 is included in the output circuit of the amplifier 53 to "anticipate" or accentuate the effects of changes in the control voltage. Under steady conditions, the output of the differentiating circuit corresponds substantially to the voltage across the capacitor 75; when the voltage on the capacitor 75 is changing, the output of the differentiating circuit changes similarly, but more rapidly. This assists in preventing "hunting" of the system.

The converter circuit 55 includes two tubes 81 and 83. The anodes of the tubes 81 and 83 are connected together to "B+," and the cathodes are connected together and to a common load resistor 85. The control grids of the tubes 81 and 83 are excited in push-pull through a transformer 87 from an A.-C. source (not shown) having a frequency of, for example, 400 cycles per second.

The control grid of the tube 83 is biased by means of an adjustable voltage divider 89 connected across the anode supply source. The grid of the tube 81 is supplied with the output of the differentiating network 79. Blocking condensers 91 and 93 prevent the flow of direct currents through the winding of the transformer 87.

The D.-C. amplifier 53 provides a certain D.-C. output voltage when the input voltage is zero. When the input voltage is of one polarity, say positive, the output voltage is greater, and when the input voltage is of opposite polarity (negative), the output voltage is less. The voltage divider 89 is adjusted to make the voltage at the grid of the tube 83 equal to the voltage appearing in the output of the amplifier 53 when the input is zero.

When the voltage across the capacitor 75 is zero, the grids of the tubes 81 and 83 are at the same potential. The tubes 81 and 83 conduct equally during alternate half cycles of the 400 cycle input. The drop across the common load 85 is like the output of a full wave rectifier, containing a large D.-C. component, an 800 cycle component and some higher order harmonics, but no 400 cycle component.

Now suppose the voltage on the capacitor 75 goes positive; the output of the amplifier 53 increases, the grid of the tube 81 goes positive with respect to that of the tube 83, and the tube 81 conducts more than the tube 83.

The circuit 55 acts more like a half wave rectifier than a full wave rectifier, and a 400 cycle component appears across the resistor 85. This may be in phase or 180 degrees out of phase with the 400 cycle supply, depending upon the transformer connections. Assume it to be in phase. If the voltage across the capacitor 75 goes negative, the tube 81 will conduct less than the tube 83, and a 400 cycle component 180 degrees out of phase with the supply will appear across the resistor 85.

The filter 57 passes only the 400 cycle component of the output of the converter 55. This component is adjusted in phase by the phase shifter 59, amplified by the amplifier 61, and appears in the output circuit of the amplifier as a voltage 90 degrees out of phase with the supply voltage. If the control voltage across the capacitor 75 is positive, the output of the amplifier 61 leads the supply voltage, and if the control voltage is negative, the amplifier output lags the supply voltage.

The follow-up motor 29 actually includes two motors, a two phase induction motor 95 and another reversible motor 97. In the present example, the motor 97 is a D.-C. motor, energized by batteries 99 through a voltage divider 101. The position of the movable arm of the voltage divider 101 controls the direction of rotation and the speed of the motor 97. When the arm is in its central position, the motor 97 is de-energized. The shaft of the motor 95 is connected to the movable arm of the voltage divider 101 and also to one of the input elements of a differential gear mechanism 103. The shaft of the motor 97 drives the other input element of the differential, and the output element drives the shaft 37 of the phase shifter 15 (Fig. 1). The connections are such that the motion of the shaft 37 is the sum of the motions of the shafts of the motors 95 and 97.

One phase winding 105 of the motor 95 is energized continuously from the 400 cycle A.-C. source. The other winding is connected to the amplifier 61 in the phase comparator 25. As already explained, the voltage applied to the winding 107 will lead that at the winding 105 by 90 degrees when the rate pulse from the receiver 3 leads the timing signal from the oscillator 13. This causes the motor 95 to rotate counterclockwise, driving the shaft 37 through the differential 103 in a clockwise direction. In addition, the voltage divider 101 is rotated counterclockwise, energizing the motor 97 to run clockwise. The speed of the motor 97 is more or less proportional to the angular displacement of the motor 95. Since the rotation of the two motors is added by the differential 103, the total rotation of the shaft 37 is approximately proportional to $$\theta+\frac{d\theta}{dt}$$

where $\theta$ is the displacement of the motor 95.

As the shaft 37 rotates clockwise, the phase shifter 15 is moved to retard the transmitted rate pulses with respect to the timing wave, and the operation of the motors 95 and 97 continues until the received rate pulses coincide in phase with the timing signal. The motor 97 acts to overcome the inertia of the mechanism, both in starting and stopping, so that the displacement of the phase shifter shaft 37 as a function of time is more nearly similar to the control voltage as a function of time. This increases the speed of response of the system to an initial change in the distance to the rate station and minimizes "hunting" or over-running and oscillation of the phase shifter shaft 37 about its correct position.

When the received rate pulse is delayed with respect to the timing signal, the operation is similar to that described above, except that the motors 95 and 97 run in the reverse direction. The result is that the shaft 37 is maintained substantially continuously in a position corresponding to the distance of the rate station. As mentioned in the description of Fig. 1, the phase comparator and follow-up system of the "drift" channel are similar to those of the rate channel, and the operation is the same.

We claim as our invention:

1. In a radio distance measuring system of the type which includes a timing oscillator, a pulse generator controlled by said timing oscillator to produce a train of periodically recurrent pulses, phase shifter means for adjusting the time relationship between said pulse train and the output of said oscillator, means transmitting a signal modulated by said pulse train, and means receiving a signal modulated by a pulse train similar to said first mentioned pulse train but delayed with respect thereto by an amount proportional to the distance being measured, apparatus for controlling said phase shifter means to maintain a predetermined time relationship between said oscillator output and said received pulse train, comprising a generator controlled by said oscillator to produce a reference wave having a fixed phase relationship to said oscillator output, a phase comparator device responsive to said reference wave and to said received pulse train to produce an output of one polarity when said received pulses occur during positive excursions of said reference wave and an output of the opposite polarity when said received pulses occur during a negative excursion of said reference wave, a reversible motor, means controlling the energization of said motor in accordance with the output of said phase comparator device, a second motor and means controlling the energization of said second motor in accordance with the angular displacement of said first motor, and means coupling said first and second motors to said phase shifter so as to displace said phase shifter in accordance with the algebraic sum of the displacements of said first and second motors.

2. In a radio distance measuring system of the type which includes a timing oscillator, a pulse generator controlled by said timing oscillator to produce a train of periodically recurrent pulses, phase shifter means for adjusting the time relationship between said pulse train and the output of said oscillator, means transmitting a signal modulated by said pulse train, and means receiving a signal modulated by a pulse train similar to said first-mentioned pulse train but delayed with respect thereto by an amount proportional to the distance being measured, apparatus for controlling said phase shifter means to maintain a predetermined time relationship between said oscillator output and said received pulse train, comprising a generator controlled by said oscillator to produce a voltage of trapezoidal wave shape having a fixed phase relationship to said oscillator output, a phase comparator device responsive to said trapezoidal wave voltage and to said received pulse train to produce an output of one polarity when said received pulses occur during positive excursions of said trapezoidal wave and an output of the opposite polarity when said received pulses occur during a negative excursion of said trapezoidal wave, a reversible motor coupled to said phase shifter means and means controlling the energization of said motor in accordance with the output of said phase comparator device.

3. In a radio distance measuring system of the type which includes a timing oscillator, means for producing a train of periodically recurrent pulses, phase shifter means for adjusting the time relationship between said pulse train and the output of said oscillator, means transmitting a signal modulated by said pulse train, and means receiving a signal modulated by a pulse train similar to said first-mentioned pulse train but delayed with respect thereto by an amount proportional to the distance being measured, apparatus for controlling said phase shifter means to maintain a predetermined time relationship between said oscillator output and said received pulse train, comprising a square wave generator controlled by said oscillator to produce a square wave voltage having a fixed phase relationship to said oscillator output, a phase comparator device responsive to said square wave voltage and to said received pulse train to produce an output whose polarity depends upon the phase relationship between said received pulses and said square wave, a reversible motor coupled to said phase shifter, and means controlling the energization of said motor in accordance with the output of said phase comparator device.

4. In a radio distance measuring system of the type which includes a timing oscillator, a pulse generator controlled by said timing oscillator to produce a train of periodically recurrent pulses, phase shifter means for adjusting the time relationship between said pulse train and the output of said oscillator, means transmitting a signal modulated by said pulse train, and means receiving a signal modulated by a pulse train similar to said first-mentioned pulse train but delayed with respect thereto by an amount proportional to the distance being measured, apparatus for controlling said phase shifter means to maintain a predetermined time relationship between said oscillator output and said received pulse train, comprising a square wave generator controlled by said oscillator to produce a square wave voltage having a fixed phase relationship to said oscillator output, a phase comparator device responsive to said square wave voltage and to said received pulse train to produce an output of one polarity when said received pulses occur during positive excursions of said square wave and an output of the opposite polarity when said received pulses occur during a negative excursion of said square wave, a reversible motor, means controlling the energization of said motor in accordance with the output of said phase comparator device, a second motor and means controlling the energization of said second motor in accordance with the angular displacement of said first motor, and differential gearing connected between said phase shifter means and said first and second motors, to adjust said phase shifter in accordance with the algebraic sum of the displacements of said first and second motors.

References Cited in the file of this patent

UNITED STATES PATENTS

| | | |
|---|---|---|
| 2,176,469 | Moueix | Oct. 17, 1939 |
| 2,427,029 | Stearns | Sept. 9, 1947 |